United States Patent

Schutze

[15] 3,645,287
[45] Feb. 29, 1972

[54] TWO-WAY VALVE

[72] Inventor: Horst Schutze, Bremen, Germany

[73] Assignee: Vereinigte Flugtechnische Werke-Fokker GmbH, Bremen, Germany

[22] Filed: Sept. 17, 1970

[21] Appl. No.: 73,020

[30] Foreign Application Priority Data

Sept. 17, 1969 Germany..................P 19 47 017.8

[52] U.S. Cl.............................................................137/219
[51] Int. Cl................................................................F16k 37/00
[58] Field of Search....................137/102, 115, 219, 596.14, 137/596.18, 627.5

[56] References Cited

UNITED STATES PATENTS 3,334,647   8/1967   Whitelaw.................................137/219

Primary Examiner—Henry T. Klinksiek
Attorney—Spencer & Kaye

[57] ABSTRACT

An insert assembly is mounted in a valve housing defining one incoming and two outgoing flow paths to further define the cross-sectional area of one outgoing flow path between its periphery and the inner surface of the housing. The insert assembly is made up of a hollow cylinder, a first and hollow piston arranged in the cylinder for movement with respect thereto, a second piston arranged in the hollow piston for movement with respect thereto, a third and blocking piston rigidly connected to the hollow piston for movement therewith for varying the cross-sectional area of the outgoing flow path further defined by the insert assembly, a slide valve arranged to selectively block the other of the outgoing flow paths, and a piston rod passing through the blocking piston for movement relative thereto and rigidly connecting the second piston to the valve slide so that the valve slide moves with the second piston. A control valve is operatively connected to the insert assembly to selectively move (1) the hollow piston and, thus, the blocking piston for opening and closing off the outgoing flow path associated with the blocking piston, and (2) the second piston and, thus, the valve slide for opening and closing off the other outgoing flow path. Means may be provided for closing off both flow paths simultaneously.

10 Claims, 6 Drawing Figures

Inventor:
Horst Schütze

BY Spencer & Kaye
ATTORNEYS.

TWO-WAY VALVE

BACKGROUND OF THE INVENTION

The present invention relates to a two-way valve having an insert disposed in a housing and arranged to leave an annular flow channel between its periphery and the housing. A cylinder is provided in the insert in which a blocking piston is disposed. The blocking piston, which is in the form of a hollow piston, can be adjusted by a control valve and serves to block and/or limit the medium flowing therethrough.

Two-way valves are used to redirect a medium from one flow direction to another flow direction. Generally, the medium itself is used to switch the valves and is brought to the corresponding operating cylinders of these valves with the aid of a control valve.

Different, so-called pressure-actuated, valves are known in which the blocking piston is hollow. In one known valve, a hollow piston is pushed over a stationary pin which has flow channels worked into it. The free end of the hollow piston is constructed as a valve cone and serves to block and control the medium flowing therethrough. This valve is not suited as a two-way valve because it has only one closed position.

A reversing valve is also known in which the medium can be directed into two different flow paths with the aid of a blocking piston and two valve seats. An example of the type of valve can be found in the German printed application Ser. No. 1,084,532, published Sept. 10th, 1964 in the name of Erich Herion and Erich Ruchser. The blocking piston, which can be controlled by a servopiston and an auxiliary cylinder, can block, depending on the position of its control valve, either the one or the other valve seat. Thus, one flow path can be selectively closed and the other opened for the medium to pass through. The problem here is that the medium can be present at both sides of the blocking piston so that, depending on the direction of flow, it reduces the pressure of the blocking piston against the valve seat. Thus, the blockage of the closed flow path can no longer be assured.

SUMMARY OF THE INVENTION

According to the present invention, the problems connected with a two-way valve provided with a hollow piston are eliminated. This is accomplished by designing the cavity of the first, or hollow, piston in the shape of a cylinder in which a second piston is disposed. The second piston is connected, via a piston rod protruding through a third, or blocking, piston, with a valve slide which closes, in the one switching position of the control valve, an annular channel provided in the housing and opens it when the switching position is changed to change the direction of flow.

With the present invention it is possible to construct a particularly advantageous two-way valve in which, in the closed positions, the blocking piston and the valve slide are pushed by the medium against the respective valve seat. A two-way valve according to a second embodiment of the present invention can also be constructed as a combination two-way and shutoff valve so that it is possible not only to block one flow path and simultaneously open the other flow path, but also to simultaneously block both flow paths.

DESCRIPTION OF THE PREFERRED EMBODIMENTS

Figure 1A:
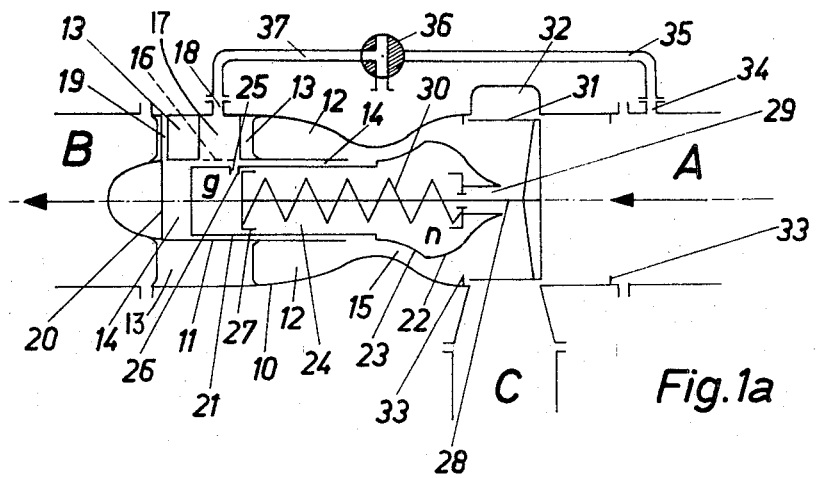
FIGS. 1a to 1c are schematic views of respective stages of operation of a two-way valve according to a first embodiment of the present invention.
Figure 1B:
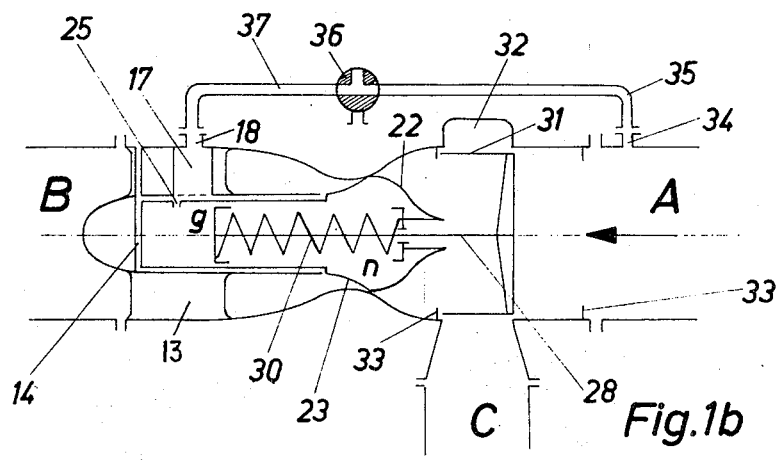
Figure 1C:
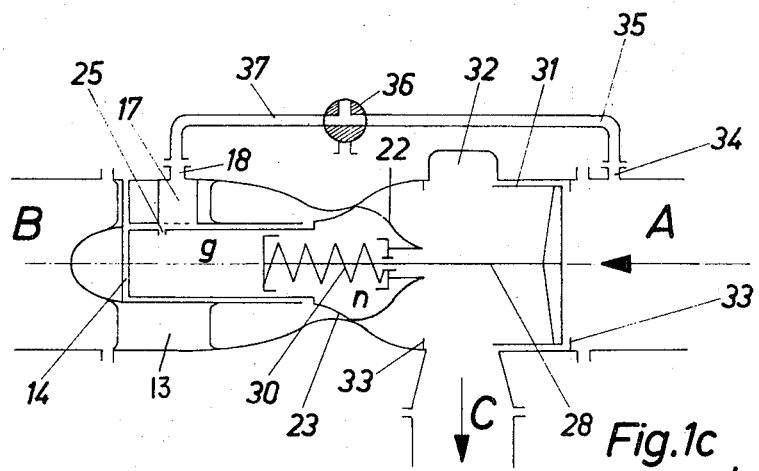

The two-way valve shown in FIGS. 1a to 1c of the drawings has a housing 10 into which an insert assembly 11 is placed in such a manner that an annular flow path 12 results. Inside insert assembly 11, which is fastened in housing 10 by means of a plurality of suitable, known supporting struts 13, there is provided a centrically disposed cylinder 14 which has an opening that points toward a valve seat 15 formed on the inner surface of a constructed portion which is, for example, approximately in the center of housing 10. Valve seat 15 is, as can be seen in the drawings, a restriction in the housing 10. Cylinder 14 is connected, via an opening 16 defined in the wall of cylinder 14 an a known pipe connection 17, with a connection piece 18 provided on the outside of housing 10.

A ventilation channel 19 also leads from cylinder 14, at the level of cylinder bottom 20, to the outside of housing 10. Channel 19 may, for example, be a length of tubing.

A first and hollow piston 21 is inserted into cylinder 14, which hollow piston 21 has its free end constructed to act as a blocking piston 22. At this blocking piston 22, a valve cone 23 is provided on the side facing the hollow piston, which valve cone 23 places itself against the valve seta 15 to close-off that particular flow path. An opening 25 is provided in the wall of the hollow piston 22, whose cavity also forms a cylinder 24. This opening 25 is disposed in such a manner that in the closed position, as well as in the open position, of hollow piston 21, a connection exist from cylinder 24 through openings 25 and 16 with connecting piece 18. Hollow piston 21 is provided with an abutment 26 inside its cylinder 24, which abutment is located at the periphery of opening 25.

A second piston 27 is arranged in the cylinder 24 defined by piston 21. A piston rod 28 is rigidly connected in a known manner to piston 27 and is passed through a passage hole 29 defined in the blocking piston 22. A suitable known compression spring 30—which is, for example, a coil spring—is slipped over the piston rod 28 within cylinder 24, which spring 30 is restrained at its one side by piston 27 and at its other side by the inner wall of the blocking piston 22 to normally bias pistons 22 and 27 toward one another. Piston rod 28 may be hollow, for the reason set out below. At the end of piston rod 28, a valve slide 31 is fastened. Valve slide 31 serves to open and close an annular channel 32 provided in housing 10. Annular channel 32 leads to an outlet portion C of housing 10, which has an input portion A disposed in front of the valve slide 31 and an outlet portion B disposed behind the insert assembly 11. The stroke of valve slide 31 is limited by abutments 33 which are provided inside housing 10. A connecting piece 34 is provided on the input portion A, from where a pipeline 35 leads to one side of a suitable, known three-way valve 36 acting as the control valve. Valve 36 is shown in cross section in FIGS. 1a–1c for convenience. The other side of the three-way valve 36 is connected via a pipeline 37 with the connecting piece 18 arranged at the outlet portion B of the two-way valve.

In the position of the valve as shown in FIG. 1a, for example, fluid medium flows from inlet portion A to outlet portion B. The three-way valve 36, which serves as the control valve, blocks the pipeline 35 to the inlet portion A and simultaneously vents cylinder 24 of the hollow piston 21 through pipeline 37. The quantity of the medium flowing from A to B is controlled in this two-way valve in dependence on the pressure at the inlet A. With an increase in pressure the blocking piston 22 is pressed, against the force of spring 30, toward valve seat 15 so that the cross-sectional area through which the medium can flow is reduced. With a reduction in pressure the changes are appropriately reversed. In this position, the two-way valve according to the present invention can, in a special case, even maintain the quantity of the medium flowing through at a constant level.

If the medium is to be redirected from direction AB to direction AC, the three-way valve 36 which serves as the control valve must be so adjusted that a connection exists from pipeline 35 to pipeline 37. FIGS. 1b and 1c show the appropriate position of the three-way value 36. After switching over the three-way valve 36 the medium flows from the inlet A through pipeline 35, 37 and openings 16 and 25 into the chamber g of cylinder 24. Thus, the hollow piston 21 is moved, against the force of spring 30, in the direction of the outlet B, so that the valve cone 23 of the blocking piston 22 is placed against valve seat 15 and blocks the passage from A to B. The space between the cylinder bottom 20 and hollow piston 21 is ventilated during this step by channel 19. This switching phase is illustrated in FIG. 1b. Then, the medium flows on into cylinder 24 of hollow piston 21 so that piston 27 is moved, against the force of spring 30, in the direction toward the inlet A. With this movement, however, piston rod 28 moves valve slide 31 in the direction toward the inlet A so that the annular channel 32 is placed in communication with inlet portion A. Thus, the medium may now flow from A to C. The stroke of valve slide 31 is limited by the abutments 33. FIG. 1c shows the two-way valve after completed switching. The ventilation of the chamber marked n occurs through the piston rod 28, which may be hollow, and the valve slide 31.

If it is desired to redirect the medium from AC to AB, the three-way valve 36 must be reset to the position shown in FIG. 1a in which it shuts off pipeline 35 and ventilates chamber g of the hollow piston 21 through pipeline 37. The resulting relaxation of spring 30 then moves valve slide 31 to the inner abutment 33 so that the annular channel 32 is blocked. Thereafter, further relaxation of spring 30 causes the blocking piston 22 to be moved in the direction toward the inlet A so that the valve cone 23 lifts off valve seat 15 and opens the way from A to B. The piston 27 now runs against abutment 26, so that the blocking piston 22, when spring 30 relaxes still more, is forced to lift off valve seat 15.

Figure 2A:
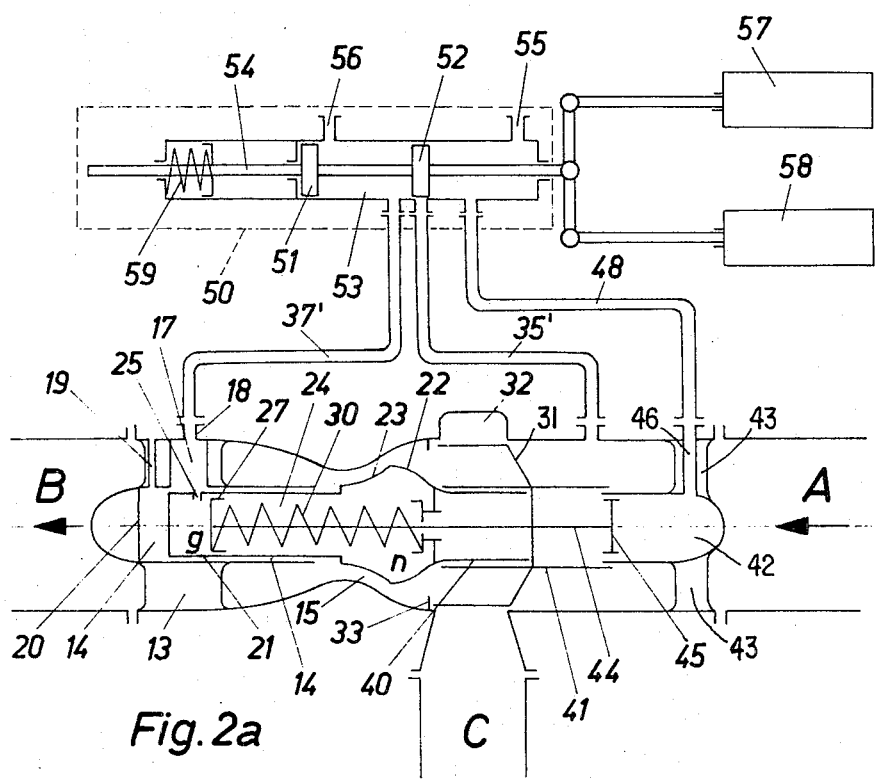
FIGS. 2a to 2c are schematic views of respective modes of operation of a combination two-way and shutoff valve according to a second embodiment of the present invention.
Figure 2B:
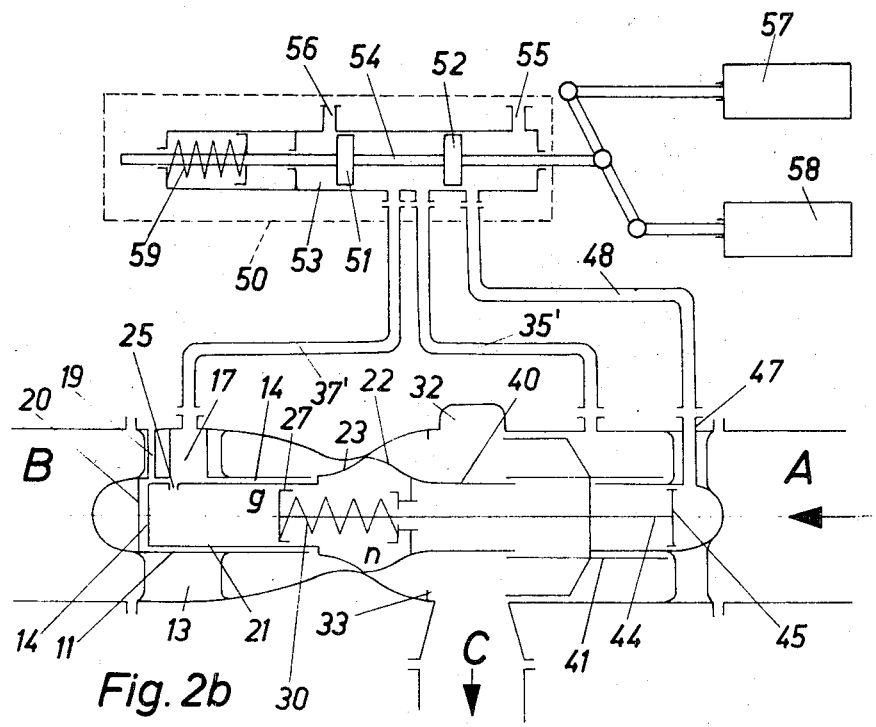
Figure 2C:
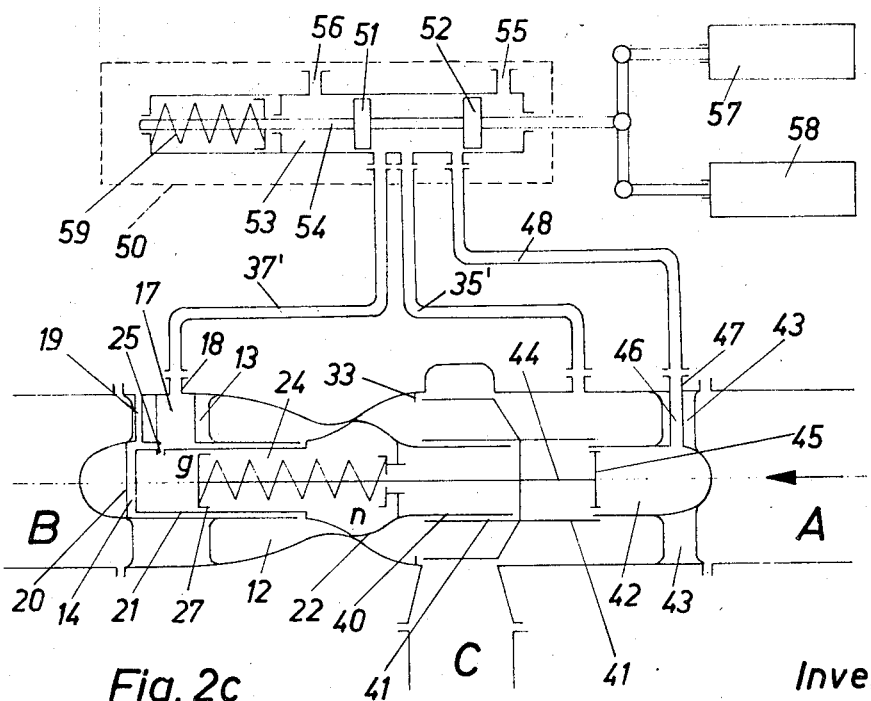

The embodiment shown in FIGS. 2a through 2c is a combined shutoff and two-way valve. This valve has the advantage, compared with the valve of FIGS. 1a-1c, that both channels—i.e., channels A and C—can be shut off simultaneously. In this valve the blocking piston 22 is additionally provided with an extension 40 which serves as a guide. This extension 40 engages in a sleeve member 41 which is rigidly connected to the valve slide 31 and extends away therefrom on both axial sides. The portion of sleeve 41 on the side of valve slide 31 toward incoming path A passes over a hollow cylinder 42 which is fastened to the housing 10 at the inlet A by means of a plurality of struts 43. Struts 43 also replace one set of abutments 33. The open end of cylinder 42 points toward valve slide 31, whose piston rod 28 is provided with an extension 44 to which a fourth piston 45 is fastened. This piston 45 movably engages in cylinder 42. A pipeline 46 leads from cylinder 42 to a connecting piece 47 provided at the outer surface of housing 10. The pipeline 35', 37' lead to a control valve 50, to which a pipeline 48 also leads from connecting piece 47.

The control valve 50 is a piston valve with two pistons 51, 52 which are accommodated in a cylinder 53 and can be adjusted by a common piston rod 54. For the purposes of the present invention, the valve 50 uses only three positions. Cylinder 53 is provided at both ends with a ventilation channel 55 and 56, respectively. Two suitable, known switching magnets 57, 58 are provided to move piston rod 54. A compression spring 59 is pushed which serves for resetting. Spring 59 may, for example, be a suitable known coil spring.

The use of this valve as a two-way valve is identical in function to that of FIGS. 1a-1c.

If the medium is to flow from A to B, the switching magnets 57 and 58 must be in their respective operating positions (FIG. 2a). The piston rod 54 of the control valve 50 is positioned such that the pipelines 48 and 37' are ventilated and pipeline 35' is closed. FIG. 2a shows this switching position, where the quantity of the medium flowing through is controlled in dependence on the pressure on the inlet side as in the embodiment of FIG. 1.

If the medium is intended to flow from A to C, the switching magnet 57 must be in its operating position and the switching magnet 58 must be in its rest position. FIG. 2b shows this switching state, in which the pipeline 48 ventilates and the pipelines 37' and 35' are connected together via cylinder 53 of control valve 50. The function here is the same as that of the embodiment of FIGS. 1a-1c.

If it is desired to shut off channels A and C simultaneously, both switching magnets 57, 58 must be in their respective rest positions. This switching state is shown in FIG. 2c, where the pipelines 35', 37' and 48 are connected together via cylinder 53 of control valve 50. Here, chamber g of the hollow cylinder 21 is supplied with the medium which flows from the inlet side A through the pipeline 35' into cylinder 53 of the control valve 50. The medium flowing into cylinder 42 from pipeline 48 prevents the medium entering into chamber g from pushing piston 27 in the direction toward the inlet side A, since the directions of movement of pistons 27 and 45 are directed opposite one another in this switching state. That is, they balance one another. The medium entering into chamber g, however, causes the blocking piston 22 2 to be pulled tightly against the valve seat 15. Thus, both channels A, C are blocked.

With the two-way valves according to FIGS. 1a-1c and 2a-2c as provided by the present invention, the pressure is reduced when the medium flows from A to B. This is done by the outer edge of the blocking piston 22, which cancels out the speed energy of the flowing medium in a known manner. Specifically, the seat 15 and piston 22 cooperate to form an annular throat.

It will be understood that the above description of the present invention is susceptible to various modifications, changes and adaptations, and the same are intended to be comprehended within the meaning and range of equivalents of the appended claims.

I claim:

1. A two-way value having one incoming and two outgoing flow paths, comprising, in combination:
   a. a housing having an inner surface defining the incoming and outgoing flow paths;
   b. an insert assembly having a periphery and mounted in said housing to further define the cross-sectional area of one outgoing flow path between its periphery and the inner surface of said housing, said insert assembly including:
      i. a hollow cylinder,
      ii. a first and hollow piston arranged in said cylinder for movement with respect thereto and defining an additional cylinder,
      iii. a second piston arranged in said the cylinder defined by said hollow piston for movement with respect thereto,
      iv. a third and blocking piston connected to said hollow piston for movement therewith for varying the cross-sectional area of said one outgoing flow path,
      v. a valve slide arranged to selectively block the outer outgoing flow path, and
      vi. a piston rod passing through said blocking piston for movement relative thereto and rigidly connecting said second piston to said valve slide so that said valve slide moves with said second piston; and
   c. a control valve operatively connected to said insert assembly to selectively move (1) said hollow piston and thus said blocking piston for opening and closing-off the said one outgoing flow path, and (2) said second piston and thus said valve slide for opening and closing-off said other outgoing flow path.

2. A two-way valve as defined in claim 1, wherein other outgoing path is partially defined by an annular channel and said housing has a constricted portion which forms a valve seat on the inner surface thereof, and wherein said blocking piston defines a valve cone which seats itself on said valve seat to block said one outgoing path.

3. A two-way valve as defined in claim 2, further including abutment means arranged in said housing for engagement by said slide valve to define a range of movement for said slide valve and said second piston.

4. A two-way valve as defined in claim 3, further including spring means arranged on said piston rod and engaging said second piston and said blocking piston for normally biasing said second piston and said blocking piston toward one another.

5. A two-way valve as defined in claim 4, further including means for connecting the incoming path to said control valve and means connecting said one outgoing path to said control valve, and wherein said hollow cylinder defines an opening which is in communication both with said means connecting said one outgoing path to said control valve and an opening defined in said hollow piston, so that a flow path is defined from said control valve to said additional cylinder.

6. A two-way valve as defined in claim 5, wherein said piston rod has an extension extending from said valve slide in the direction of the incoming flow path, and additional hollow cylinder mounted in said housing and spaced in the direction of the incoming flow path from said valve slide, and a fourth piston mounted on said extension and engaging in said additional hollow cylinder for movement with respect thereto.

7. A two-way valve as defined in claim 6, further including means for connecting said additional hollow cylinder to said control valve for selectively moving said fourth piston and, thus, said slide valve for opening and closing-off said other outgoing flow path.

8. A two-way valve as defined in claim 7, further including a sleeve member rigidly connected to said valve slide and portions extending away therefrom toward said blocking piston and said additional hollow cylinder, respectively, and wherein said blocking piston has an extension guide which is dimensioned to fit into the portion of said sleeve member extending toward said blocking piston and wherein said additional hollow cylinder is dimensioned to fit into the other extending portion of said sleeve member.

9. A two-way valve as defined in claim 8, wherein said control valve is a piston valve.

10. A two-way valve as defined in claim 5, wherein said control valve is a three-way valve.

* * * * *